United States Patent Office 3,273,278
Patented Sept. 20, 1966

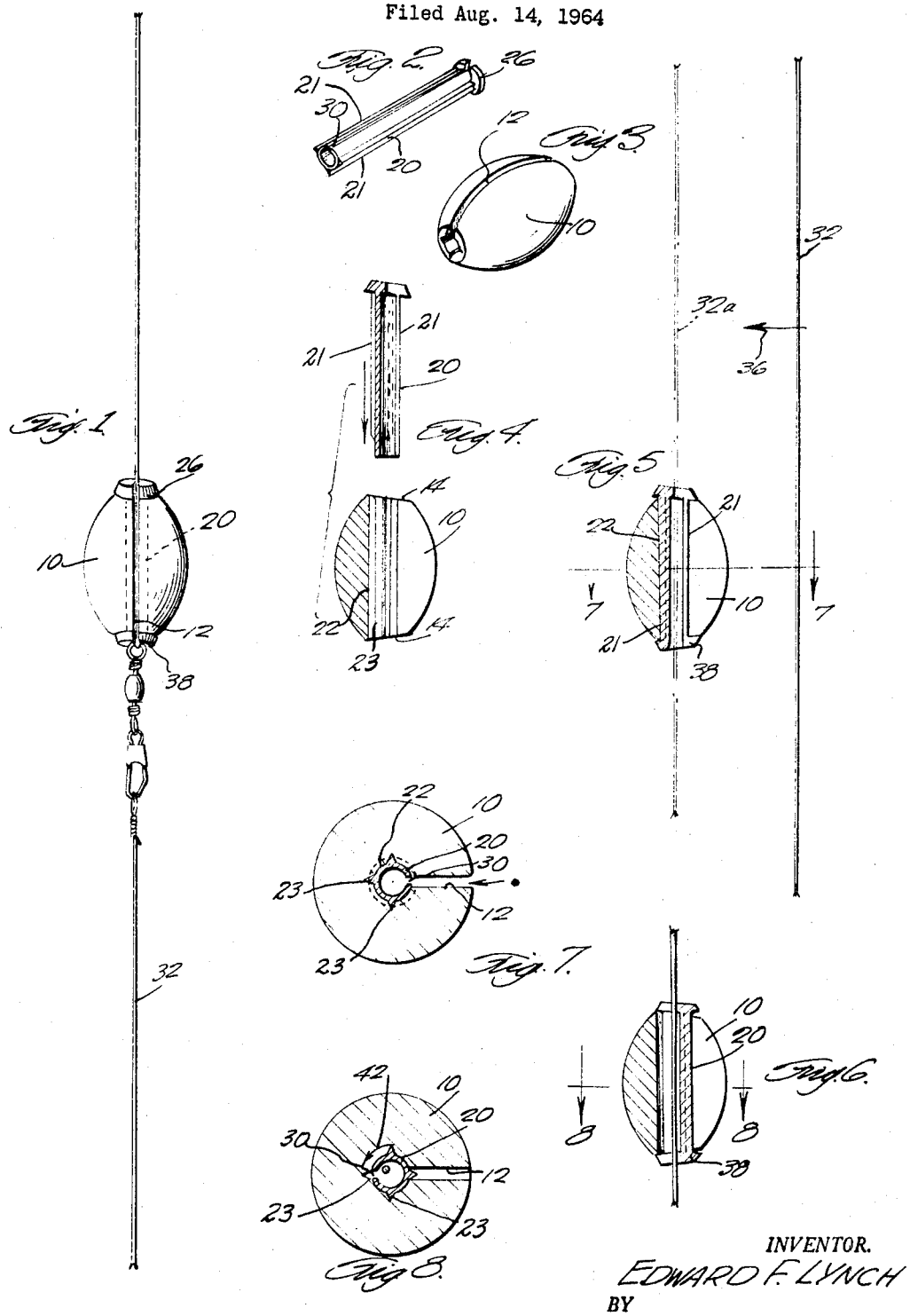

3,273,278
FISH LINE SINKERS AND FLOATS
Edward F. Lynch, 6429 Plunkett St.,
West Hollywood, Fla.
Filed Aug. 14, 1964, Ser. No. 389,754
3 Claims. (Cl. 43—44.87)

The present invention relates to an improvement in fish line sinkers and floats wherein it is desired to provide a simple and effective fish line component constructed so that it may slide freely along a portion of a fish line or may be securely affixed to the line, and which is not necessarily directly engageable with a plastic core or tubing of the fish line component, and in which the core thereof is adapted to be locked into place as a result of its improved construction.

More particularly, one feature of the invention relates to a new and improved construction of a fish line sinker having the advantage that the sinker is provided with a slightly beveled edge at both ends, and between the beveled portions there extends a slot from the longitudinal axis of the sinker to one surface thereof, and there is provided a coaxial opening along said longitudinal axis for receiving a hollow plastic tubing. The plastic tubing is provided with a slot along an element of its cylindrical surface, and each end of the plastic tubing is deformed to conform to the beveled surface of the sinker when the slot of the sinker and the slot of the hollow tubing are in aligned position. Thus, there is provided the advantage of a locking effect in retaining the fish line in its extended position through the hollow of the plastic tubing without inadvertent rotation of the tubing for allowing the lead sinker to come off of the fish line. It is seen that both ends of the sinker are provided with a slight bevel. The low point of the beveled surface with respect to the center of the sinker may be provided in the slot zone of the surface, while the high point of the beveled surface is in a zone opposite from the slot. The slot in the core and the slot in the sinker may be non-aligned in opposite relation to the axis, so that they are essentially 180° out of phase relation, and when it is desired to thread or pass line through the slots, the plastic tube is turned in a clockwise or counterclockwise direction one-half of a turn to align the slots and to release the binding effect or action due to the pliability and resiliency of the plastic that has been conformed to the beveled surface so that the thread may be passed through the slots, and the hollow tubing is then turned a half turn to its out-of-alignment relationship and the beveled surface of the sinker coacts with the beveled ends of the hollow tube so that they are in strained relation and not inclined to turn for the slots to become aligned.

Therefore, an object and feature of the invention is to provide a device that tends to prevent slots of concentric and coxial elements becoming loose and inadvertently rotated, so that fish lines are not apt to become disassociated with the sinkers or floats that are provided thereon while using the concept of the present invention.

The core may be made of any conventional resilient, plastic material, and it is found that the plastic head may be of any size or shape. There is no wastage of line due to cutting the line in order to thread it through the aligned slots of the sinker and tubing, and it is found that the fish line does not become frayed from the lead since it is protected by the plastic tube. In certain cases, it is found that colored heads of the plastic tubing may tend to lure fish to the vicinity of the sinker and the accompanying bait on the line. These and other features and advantages of the invention will become apparent from the following detailed description and accompanying drawings in which:

FIGURE 1 is a perspective view of a fish line sinker in accordance with the present invention disposed along a fish line;

FIGURE 2 is the slotted hollow tube having one head applied thereon for applying it through the cylindrical opening of the fish sinker;

FIGURE 3 is a perspective view of a lead sinker in accordance with the present invention having beveled edges in which one thereof is shown;

FIGURE 4 is a cross-sectional view of the hollow tube and the sinker in relation for applying the tube to the sinker, and showing the beveled edges, all in accordance with the present invention;

FIGURE 5 shows the manner in which the fish line may be applied to the sinker and tube when their slots are in aligned relation;

FIGURE 6 shows a cross-sectional view taken along the longitudinal axis in which the slot of the tube is in maximum non-aligned position with the slot of the sinker;

FIGURE 7 shows a cross-sectional view taken along lines 7—7 of FIGURE 5; and

FIGURE 8 shows a cross-sectional view taken along lines 8—8 of FIGURE 6.

Referring to the drawings, there is shown a fish line component such as a float or sinker 10 having a thin slot 12 extending from the longitudinal axis of the sinker 10 to a point on the surface of the sinker. The slot is sufficiently wide in dimension for receiving a fish line. The polar extremities of the sinker, such ends coinciding with the axial zones of the slot, are provided with a beveled surface that extends toward a common direction, as is clearly shown in FIGURES 3, 4, 5 and 6.

FIGURE 4 particularly shows that the beveled portions 14, 14 are tapered toward a common point external of the sinker 10, and that there may be applied thereto a hollow elongated plastic tube 20. The tube 20 is slightly longer than the entire longitudinal length of the slot extending along its longitudinal axis and has external rib-like portions 21, 21 throughout its length, and the sinker is seen to contain a cylindrical opening 22 along said longitudinal axis sufficient in diameter for receiving said plastic tube 20. The opening 22 is cylindrically configured and extends along the longitudinal axis as is shown, and has a radial dimension that is substantially equal to the outside radial dimension of the main portion of the tube 20 and the opening 22 contains along its length mating recess 23, 23 for the rib-like portions 21, 21. At one end of the tube there is provided a head 26, as shown in FIGURE 2, and the outside diameter of the head is sufficient for precluding the tube from entirely passing through the cylindrical opening 22 in the sinker.

Along one element of the cylindrical surface of the hollow tube 20 there is provided a slot 30 sufficiently wide in dimension for allowing the fish line 32 to pass therethrough. Thus there is shown a slip-on sliding arrangement in which the width of the slot in the resilient plastic core may be less than the diameter of the line. When the line is placed in the sinker slot and pulled down tightly, the resilient plastic walls will depress and expand to allow the line to enter. When the plastic head is turned, the sinker will slide along a given portion of the line. When the line is placed in the sinker slot but not pulled entirely down into the core, the line will bind securely between the plastic core and the inside walls of the sinker. When the plastic head is turned, it then becomes stationary and secure so that it does not slide along the line. FIGURE 5 shows the slot 30 of the tube 20 in substantial alignment with the slot 12 of the sinker 10 so that the fish line 32 may be passed therethrough as shown by the arrow 36, until the fish line is disposed in a relationship axially disposed of the sinker and the tube, as is shown by fish line 32a.

In the construction of the invention, the tube 20 is passed through the cylindrical opening 22, as has been described in connection with FIGURE 4. After the tube has been passed through the cylindrical opening 22, the free end of the tube 20 may be molded in a manner to form a head 38, as shown in FIGURES 1, 5 and 6, so that the relative attitude of the heads in their beveled condition conforms generally to the beveled zone 14, 14, respectively, of the sinker 10. The drawing shows the preferred embodiment of inclining the attitude of the heads to conform to the beveled zone surfaces 14, 14 of the sinker 10 while the slots are in their aligned relationship.

Another feature and advantage of the invention is to provide the beveling in a relationship such that the slots are in opposite aligned relationship and, in either fashion, the locking effect of the invention is achieved due to the resilient effect of the plastic of the tube 20 demonstrated in the heads 26, 38, as coacting and cooperating with the beveled surfaces 14, 14. FIGURE 6 shows the tube 20 having been rotated a one-half turn in either a clockwise or counterclockwise direction for engaging the heads 26, 38 in a biased relation with respect to the beveled zones 14, 14, so that the tube 20 is relatively secure and locked in place within the sinker 10.

FIGURES 7 and 8 are cross-sectional views in which FIGURE 7 shows the slots in relative alignment, and FIGURE 8 shows the alignment of the slots in relative opposite alignment with respect to the longitudinal axis of the sinker 10. The arrow 42 shows the relative rotation of the tube 20 with respect to the sinker 10 in order to achieve such non-alignment.

Additional embodiments of the invention in this specification will occur to others, and therefore it is intended that the scope of the invention be limited only by the appended claims and not by the embodiments described hereinabove. Accordingly, reference should be made to the following claims in determining the full scope of the invention.

What is claimed is:

1. A fish line sinker comprising a sinker of ellipsoidal configuration and having a slot extending from a longitudinal axis thereof to a point on the surface of the sinker, a cylindrically disposed opening extending along the longitudinal axis and coaxial therewith, a hollow resilient plastic tube having an outside diameter substantially equal with the diameter of the cylindrical opening and having a head at one end thereof larger than the cylindrical opening, said hollow plastic tube having a slot extending from end to end thereof and a length slightly greater than the length of the cylindrical opening along the longitudinal axis, and said hollow plastic tube being rotatably positioned within said cylindrical opening, a beveled surface at each polar zone of the sinker about the longitudinal axis at opposite ends of said cylindrical opening, each beveled surface being inclined with respect to the center of the sinker toward a common point, and end means on the free end of the hollow plastic tube together with said head at said one end being molded to conform to the inclined attitude of the beveled surface when the slots of the tube and the sinker are in alignment, and providing thereby means for substantially locking the tube and sinker when the slots are in maximum non-aligned position.

2. A fish line device for quick attachment to fish lines comprising a generally ellipsoidal configured device having a slot extending from a longitudinal axis thereof to a point on the surface of the device, a generally cylindrical opening disposed along the longitudinal axis and concentric therewith for receiving a fish line therein, a hollow resilient plastic tube having an outside diameter substantially equal with the inside diameter of the cylindrical opening and having a head at one end thereof generally larger than the cylindrical opening and further having a slot for receiving partially therein said fish line, said hollow plastic tube having a slot extending from end to end thereof and a length generally greater than the length of the cylindrical opening along the longitudinal axis, and said hollow plastic tube being rotatably positioned with said cylindrical opening, a beveled surface at each zone about the cylindrical opening at opposite ends of said cylindrical opening, each beveled surface being inclined with respect to the center of the device and generally being directed toward a common point exterior of said device, and the free end of said plastic tube together with said head at said one end thereof being molded to conform to the inclined attitude of the beveled surface when the slots of the tube and the device are in alignment, providing thereby means for substantially locking the fish line in the plastic tube and said device in fixed relation when the slots are in maximum non-aligned position.

3. The invention of claim 2 wherein said plastic tube has external rib-like portions along its length and the generally cylindrical opening has mating recesses along its length for receiving the rib-like portions.

References Cited by the Examiner

UNITED STATES PATENTS

| | | | |
|---|---|---|---|
| 2,001,241 | 5/1935 | De Vries | 43—44.9 |
| 2,772,509 | 12/1956 | Vadnais | 43—44.91 |
| 2,807,907 | 12/1957 | Brite | 43—44.91 |
| 2,902,792 | 9/1959 | Friday | 43—44.87 |

SAMUEL KOREN, *Primary Examiner.*

W. H. CAMP, *Assistant Examiner.*